Sept. 22, 1959   D. D. COLEE   2,904,911
GYROSCOPIC CONTROL MECHANISM FOR GRADING APPARATUS
Filed April 4, 1955   3 Sheets-Sheet 1
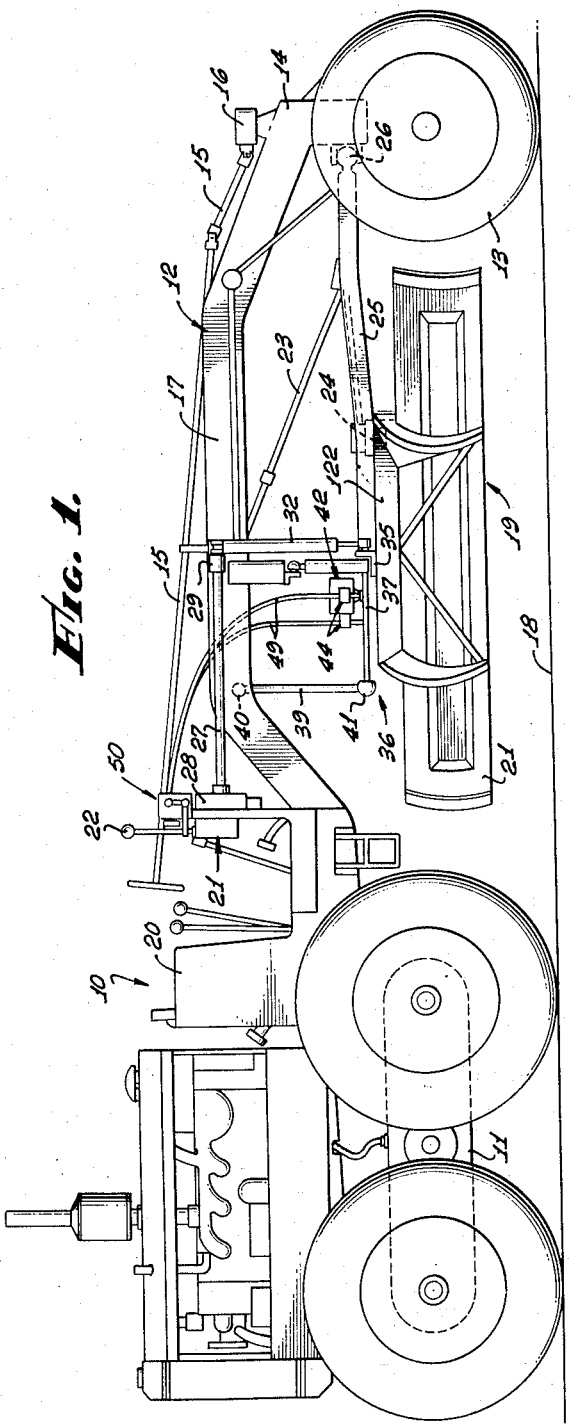
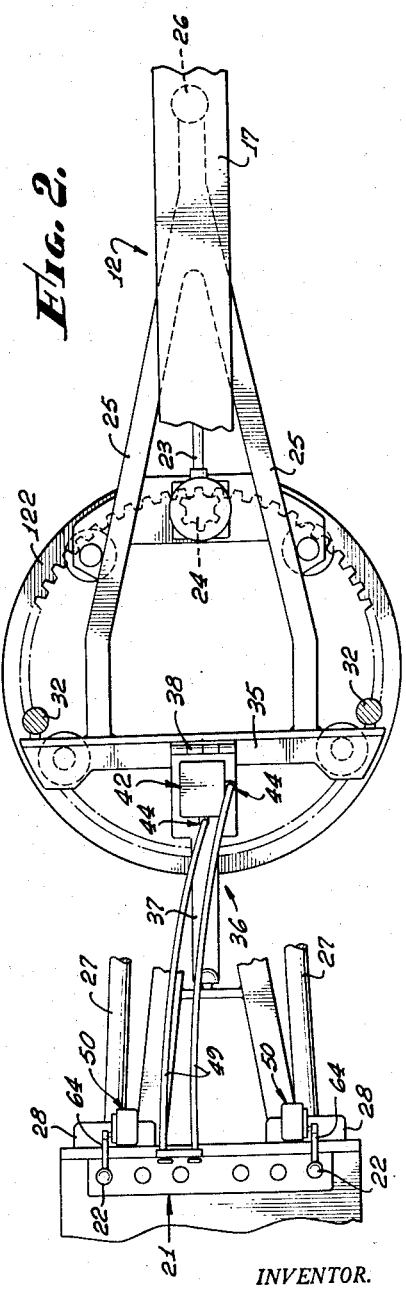
INVENTOR.
DONALD D. COLEE
BY
ATTORNEY.

Sept. 22, 1959.　　　　D. D. COLEE　　　2,904,911
GYROSCOPIC CONTROL MECHANISM FOR GRADING APPARATUS
Filed April 4, 1955　　　　　　　　3 Sheets-Sheet 2
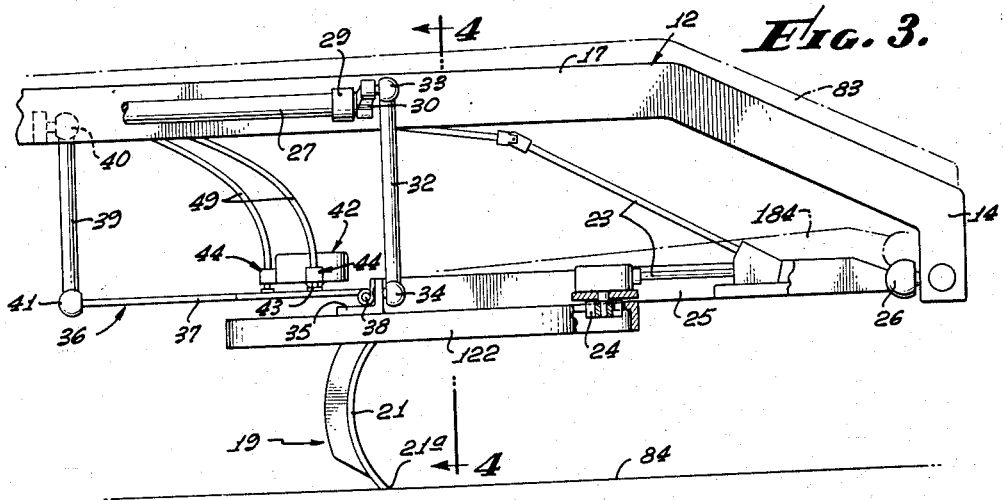
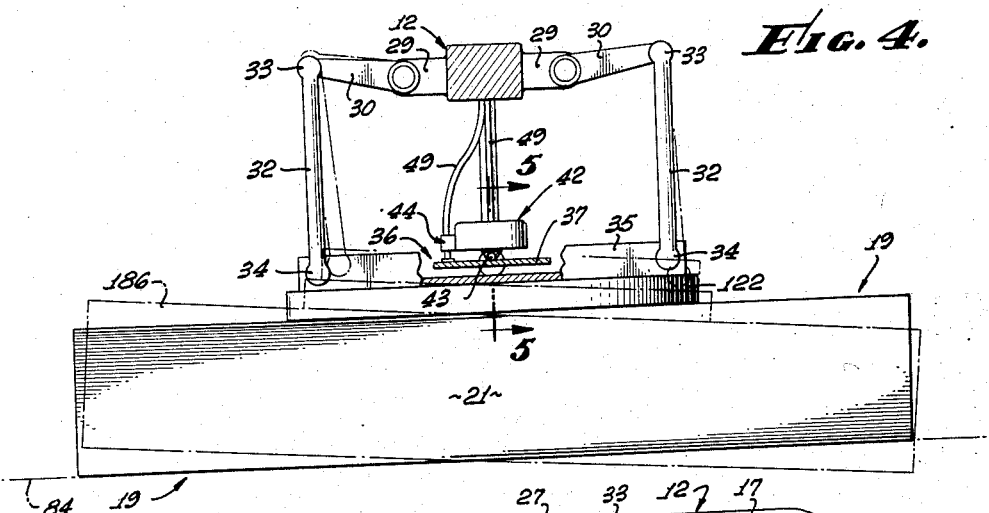
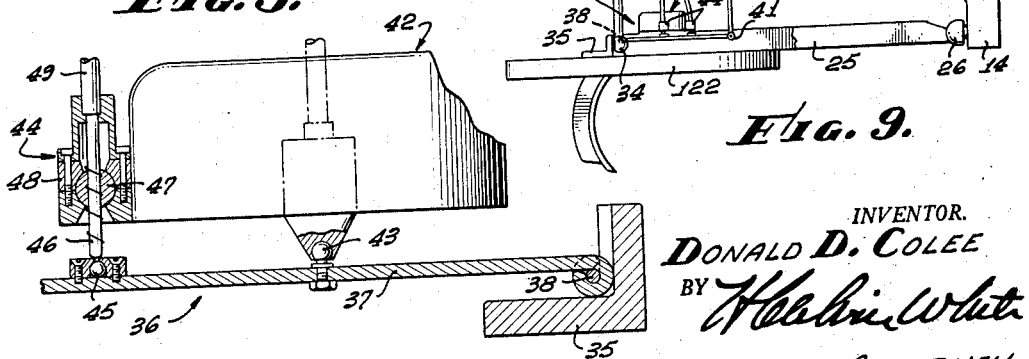
INVENTOR.
DONALD D. COLEE
BY
ATTORNEY.

Sept. 22, 1959 D. D. COLEE 2,904,911
GYROSCOPIC CONTROL MECHANISM FOR GRADING APPARATUS
Filed April 4, 1955 3 Sheets-Sheet 3
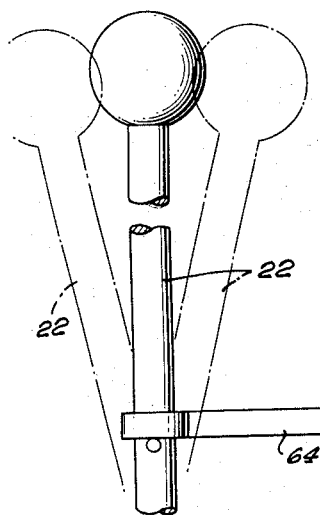
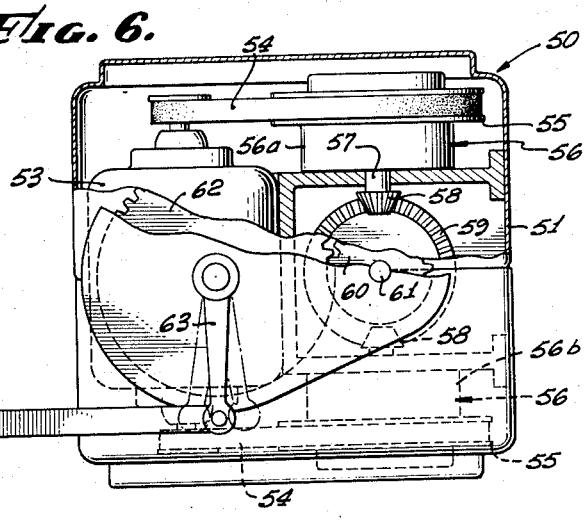
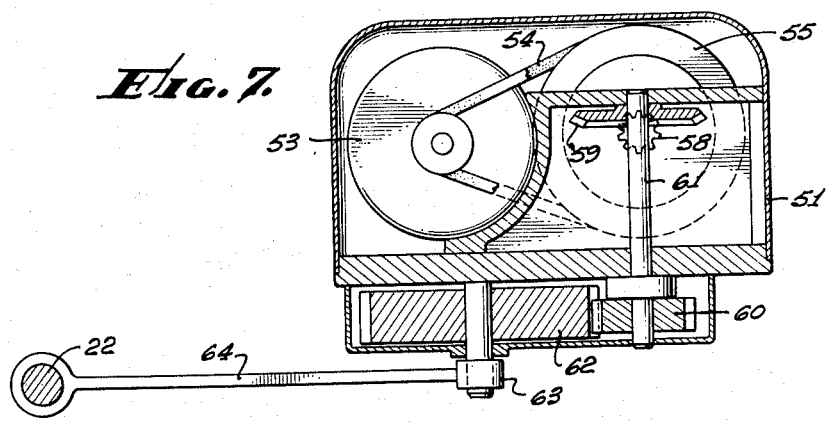
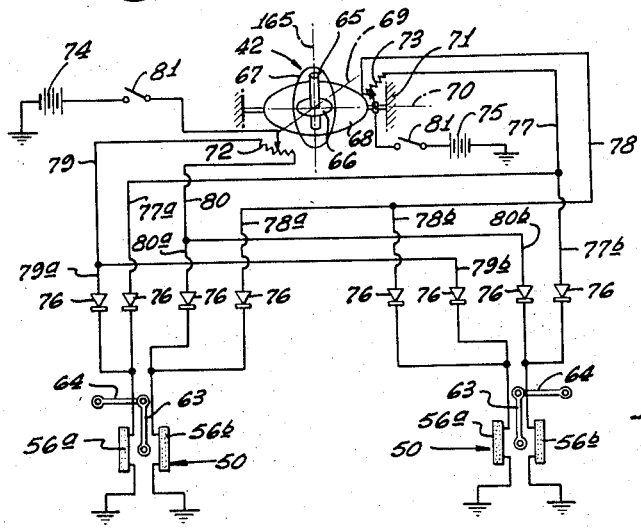
INVENTOR.
DONALD D. COLEE
BY
ATTORNEY.

ized Sept. 22, 1959

United States Patent Office

2,904,911

GYROSCOPIC CONTROL MECHANISM FOR GRADING APPARATUS

Donald D. Colee, Phoenix, Ariz., assignor, by direct and mesne assignments, to Preco Incorporated, Los Angeles, Calif., a corporation of California Application April 4, 1955, Serial No. 498,983

14 Claims. (Cl. 37—156)

This invention has to do generally with earth working and moving equipment to be operated at and along the ground surface for moving earth in a predetermined manner. More particularly, the invention is directed to motorized earth grading apparatus including a grading blade designed to establish a desired grade or leveled condition of the earth through vertical and angular control of the blade during the time that the grading apparatus transports the blade along the ground surface.

Structurally, and in one of its aspects, the invention is concerned with the provision of mechanism carried by the motor grader for maintaining the working edge of the grader blade in a plane extending substantially in the direction of grader movement along the ground surface and for the purpose of accurately and automatically controlling the blade to establish a leveled or graded condition of the earth worked by the blade no matter what inclination is assumed by the motor grader. Within the broad scope and meaning of the term "blade" are included various other earth working tools having different shapes, including earth working elements of bull dozers, trenchers, land planes and scrapers, the essential characteristic of the tool being its ability, through control of the above mentioned mechanism, to be transported along or in engagement with the earth in a condition of continuing alignment relative to a substantially horizontally extending line. In addition, the term "plane" as broadly contemplated includes paths swept by curved as well as straight blade edges, during forward blade movement in continually aligned condition.

Further in connection with the control of the blade, the invention contemplates in its preferred form a relatively simple mechanism including a gyroscope having a connection with the blade or tool and controlling actuating means for the blade, all in such manner as to effect blade displacement in response to inclination of a frame supporting the blade so as to maintain the blade in its desired continually aligned condition, with the blade edge lying in a plane extending in the direction of grader travel. The invention is particularly concerned with the novel aspects of positively controlling automatically and in accordance with or response to frame inclination the displacement of the blade to maintain it continually aligned. In this connection, and as will later appear in full detail, the invention includes the provision of a novel support for the gyroscope, preferably having a pivotal relationship with the blade and with the frame in a manner facilitating response of the gyroscope to frame inclination in a pitching or rolling sense, the support also allowing adjustable initial setting of blade angle and height through angular positioning of the gyroscope to achieve a desired grade angle and height.

Other objects of the invention have to do with the provision of novel gyroscope controlled means for controlling the blade actuator so as to effect automatic control of the actuator and thereby to maintain the blade edge in the plane established by such initial blade position. Additional features include a novel electrical circuit interconnecting gyroscope potentiometers and magnetic clutches to transmit motion to the blade actuator for securing angular displacement of the blade in a pitching and rolling sense and continuously maintain it in the established plane.

The invention has various additional features and objects, together with the details of certain typical and preferred embodiments, it will be understood more fully and to best advantage from the following description of the accompanying drawings, in which:

Fig. 1 is an elevation showing the complete motor grader;

Fig. 2 is a plan view of the forward portion of the motor grader;

Fig. 3 is an enlarged elevation showing in detail that portion of the grader associated with the blade;

Fig. 4 is a section taken on line 4—4 of Fig. 3;

Fig. 5 is an enlarged section taken on line 5—5 of Fig. 4 illustrating the details of the gyroscope mount;

Fig. 6 is an enlarged fragmentary view of a control unit for the grader blade;

Fig. 7 is a plan view taken in section of the control unit shown in Fig. 6;

Fig. 8 is a circuit diagram illustrating the connections between the gyroscope and the power unit; and Fig. 9 is a reduced elevation showing a modified form of the invention.

Referring generally to Figs. 1 and 2, the motor grader 10 is shown in outline to comprise an engine-driven wheeled vehicle or carriage including a wheel carrying rear frame 11 and a forward frame 12 mounting a leaning wheel or wheels 13 at its forward end 14. The latter is controllable as is well-known in the art by the operator through appropriate shafting 15 and gearing 16. That portion 17 of the frame 12 between the rear frame 11 and the leaning wheel 13 is angled or displaced upwardly relative to the ground level 18 over which or along which the grader is movable, in order that the blade assembly 19 may be suspended therebeneath.

A pivotal connection (not shown) of the forward frame 12 with the rear frame 11, which is common, facilitates vertical pivoting of the forward frame in a longitudinal plane during the course of travel of the grader over and along the ground in accordance with an uneven condition thereof, such pivoting having the effect of raising or lowering the blade assembly 19 in accordance with changing ground level conditions. For this reason, and in accordance with the desired purpose of the grader, the blade assembly 19 is controllable by the operator at the platform 20 by means of the control panel 21, the latter including right and left-hand toggle levers 22 which are suitably and operatively connected in controlling relation with powered actuating mechanism for the blade assembly to accomplish raising or lowering of the blade relative to the frame 12, and lateral tilting inclination of the blade relative to the frame.

Extending the description to Figs. 3, 4 and 5, in which the blade assembly, frame and powered actuating means for the blade assembly are shown in greater detail, the blade assembly 19 is shown to include an arcuate blade 21 carried and suspended for earth engagement beneath ring-shaped circle 122 for rotation relative thereto to establish a desired grading blade angle, as may be effected by control shafting 23 turning a gear 24 engageable with the toothed inner diameter of the circle. The latter is rigidly hung beneath supporting draw bar 25 extending rearwardly from a universal pivot connection 26 with the forward end 14 of the frame 12, the latter connection allowing universal inclination of the draw bar and the circle supported therefrom.

As referred to above, the position of the blade assembly 19 relative to the frame 12 is controlled by powered actuating mechanism, including a pair of rotatable lifting shafts 27 disposed on opposite sides of the frame 12 and connected to suitable motor units 28 for rotating the lifting shafts separately or together and in opposite or similar directions in accordance with the positions of right and left-hand control levers 22. The forward ends of the shafts are journaled in laterally extending frame supports 29 and connected to lifting cranks 30. The cranks 30 are themselves connected to lifting links 32 by joints 33, the links suspending the blade assembly and controlling the position thereof in accordance with angular displacement of the cranks 30. In order that the blade assembly may be shifted laterally, as is common in the art, suitable ball and socket connections 34 are formed between the lower ends of the links and a transverse structural member 35 connected to the circle 122.

Coming now to a description of the automatic position control mechanism for the blade assembly, a pivot assembly 36 is shown in Figs. 1 through 5 to comprise a platform 37 extending rearwardly, relative to the direction of travel of the grader, from a hinge connection 38 with transverse member 35. The opposite end of the platform 37 is suspended from frame 12 by a link 39 having universal pivot connections 40 and 41 with the frame and the platform respectively, the latter allowing longitudinal and lateral pivoting of the platform relative to the frame. The platform 37 is therefore connected for angular vertical displacement with the blade assembly 19 about pivot 41, but angularly oppositely to vertical pivoting of support 25 about pivot 26, for purposes as will appear.

Platform 37 carries a gyroscope assembly 42 which may be suitably erected, as by pivot connection 43 with the platform 37 for universal inclination relative thereto. In order to maintain the gyroscope case in selected angular disposition relative to the platform 37, lateral and longitudinal jack screw assemblies 44 are mounted at one side and at the rear of the gyroscope assembly in pivotal relation to the platform, as by means of a ball and socket connection 45 shown in Fig. 5. A typical jack screw assembly is shown in Fig. 5 to comprise a vertically extending lead screw 46 threadedly engaged with a short cylinder 47 housed in a socket formed by body 48, which is in turn joined to the gyroscope case. For blade height and angle adjustment purposes, flexible shafts 49 extend between the control panel 21 and the two screws in order that the operator may turn the screws to displace the bodies 48 and thereby pivot the gyroscope case longitudinally or laterally relative to the platform 37, the lead screws 46 serving to retain the gyroscope case in its desired resulting position relative to the platform through frictional engagement with the cylinders 47. In connection with gyroscope case inclination relative to the platform, an accurate control of such inclination may be achieved through certain known types of adjusting controls at the control panel. For example, a typical adjustment in the inclination of the gyroscope assembly relative to the platform can be achieved using Bowden controls with an accuracy on the order of one-half a degree.

Referring now to Figs. 6 through 8, the control mechanism associated with gyroscopic position control of the blade assembly through operative connection with the powered actuating mechanism for the blade assembly will now be described. Assuming for the moment that electrical signals are generated upon lateral or longitudinal gyroscope case inclination, as associated with lateral and longitudinal pivoting of frame 12, such signals are utilized to energize left and right-hand control units 50 associated with left and right control handles 22. Contained within the housing 51 of each control unit 50 is an electric motor 53 driving V-belts 54 off opposite ends of the motor shaft, the V-belts 54 rotating sheaves 55 which serve to transmit input rotation to a pair of magnetic clutches 56. The two clutches in each control unit are designated 56a and 56b, respectively. These clutches typically contain magnetic material such as iron filings between their input and output members of a nature such that upon electrical energization of the material it assumes a more or less rigid form, depending upon the degree of energization, for transmitting rotation to the output member. As shown in Fig. 6, an output shaft 57 of each clutch drives a pinion 58, the pinions associated with bloth clutches engaging a bevel gear 59 which drives a spur gear 60 through shaft 61, the pinions being arranged in opposition to transmit opposing torque loads to the bevel gear. A second spur gear 62 of larger diameter than gear 60 meshes therewith to transmit rotation to output crank 63, the latter being operatively connected in push-pull relation with manual control lever 22 through a link 64 joined therebetween. Each control lever 22 is typically shifted to blade lifting position by energization of clutch 56a, and to blade lowering position by energization of clutch 56b, in the associated control unit 50. It is apparent that the relatively high rotative speed of the motor 53 is successively stepped-down or reduced by the gears, pulleys and the crank mechanism, so that a large torque multiplication is achieved for moving the manual control lever 22 between control positions shown in the dashed lines of Fig. 6.

The electrical input to the control unit 50 will now be described in connection with the showing of Fig. 8. The gyroscope assembly 42 is illustrated in simplified form to comprise a vertical spin shaft 65 around the spin axis 165 of which the gyroscope wheel 66 is driven at high speed, spin shaft 65 being carried by gimbal ring 67. The latter is itself journaled for rotation in ring 68 about pitch axis 69 extending at right angles to the axis 165 of shaft 65, while ring 68 is journaled for rotation about roll axis 70 extending at right angles to axis 69 and axis 165. The gyroscope may be of the type capable of spin axis erection to gravity vertical and roll axis erection to the case of the gyroscope, represented by numeral 71 in Fig. 8. In addition, suitable potentiometers 72 and 73 are carried by the gyroscope assembly in such relation to the gimbal rings as to displace the wiper arm of potentiometer 72 in proportion to rotation of gimbal ring 67 about axis 69 relative to the case 71, while wiper arm associated with potentiometer 73 is displaced in proportion to the rotation of gimbal ring 68 about axis 70 relative to the case of the gyroscope. With the two wiper arms of the potentiometers independently connected in series with sources of current represented respectively by batteries 74 and 75, energization of the potentiometers 72 and 73 is affected respectively by movement of the gyroscope assembly in pitch and in roll, the former resulting from pivoting of frame 12 in a vertical longitudinally extending plane and the latter resulting from lateral pivoting of the frame in a vertical transversely extending plane.

The electrical circuit connecting the potentiometers to the magnetic clutches consists primarily of a combination of conductors and rectifiers 76 to simplify the system insofar as is possible. The opposite ends respectively of the slide wire of roll potentiometer 73 are connected to conductors 77 and 78, conductor 77 branching to form conductors 77a and 77b connected through rectifiers 76 to magnetic clutch 56a in one control unit and to clutch 56b in the other control unit. Similarly, conductor 78 branches to form conductors 78a and 78b connected respectively through rectifiers to clutch 56b in onec ontrol unit, and 56a in the other. The opposite ends of the slide wire of pitch potentiometer 72 are connected to conductors 79 and 80, conductor 79 branching to form conductors 79a and 79b respectively connected through rectifiers 76 to the magnetic clutch 56a in each control unit, and conductor 80 branching to form conductors 80a and 80b connected respectively through rectifiers to the magnetic clutch 56b in each unit. Electrical current supplied through the batteries 74 and 75 passes through switches 81, when closed, through the wiper arms of the potentiometers and thereafter divides in the slide wires of the potentiometers according to the position of the wiper arms in contact therewith. The current flows through the conductors, rectifiers and magnetic clutches to ground, the magnitude of the current flowing through each clutch determining the degree of engagement of that clutch, which in turn controls the torque transmitted thereby to gear 59.

Assuming now that the motor grader operator desires to operate the grader with the grader blade edge 21a carried in a selected plane 84 extending in the general direction of grader movement along the ground, it is apparent that uneven conditions of the ground surface will be transmitted to the vehicle 11 and frame 12 tending to deflect the blade edge from a condition of alignment in the desired grading plane. For example, the leaning wheel 13 of the grader may drop or rise relative to the wheeled vehicle 11 upon arrival at small depressions or rises in the ground, imparting a pitching movement to the frame 12 in a longitudinally extending vertical plane. Also, uneven ground will impart rocking or rolling lateral movement to the grader frame in accordance with the differences in level between the left and right side wheels of the vehicle 11. These motions are transmitted to the platform 37 on which the gyroscope assembly is pivotally mounted and also to the blade assembly 19 tending to displace the blade edge out of the desired plane. However, any tilting of the gyroscope case gives rise to energization of the magnetic clutches in such manner as to bring about movement of the control levers 22 so as to displace the blade and maintain it in its desired alignment.

Rolling of the frame 12 in one direction results for example, in increased current flow to clutch 56a in one unit 50 and to clutch 50b in the other unit, accompanied by decreased current flow to clutch 56b in the one unit and to clutch 56a in the other unit. The torque unbalance set up in the control units acts through the reduction gearing to displace the control handles 22 in opposite directions, so as to effect transverse angular displacement of the blade assembly to maintain it in aligned condition, corresponding to a final condition of torque balance in each control unit. Similarly, pitching of the frame 12 causes displacement of right and left control levers 22 both in the same direction to angularly displace the blade assembly oppositely to the longitudinal frame inclination.

A particular novel feature of the invention concerns the mounting of the gyroscope and the pivot assembly 36 in such manner as to effectively maintain the blade edge against vertical displacement otherwise caused by pitching of the frame 12. Accordingly, when the frame 12 pivots upwardly to the broken line position 83 shown in Fig. 3 the draw bar 25 and platform 37 would be raised directly upward to draw the blade edge 21a out of the plane 84 of desired travel of the edge were it not for the action of the gyroscope. The upward pivoting of the frame tends to tilt the gyroscope case out of its established position, with the result that a change in electrical current is transmitted to the clutches to energize them and thereby effect movement of the control levers 22 to displace the blade assembly downwardly by an amount substantially equal to upward pivoting of the frame. The configuration of the draw bar 25 after upward pivoting of the frame is shown by the dashed line 184 in Fig. 3, indicating an angled relationship with the platform 37 accommodated by the hinge connection 38 between the platform and cross bar 35.

Referring to Fig. 4, rolling motion of the frame 12 in a lateral direction would be productive of tilting of the blade assembly 21 out of its desired aligned condition such as shown by broken lines 186; however, the gyroscope responds to any attempted tilting and transmits an electrical signal from the roll potentiometer 72 to the magnetic clutches in such manner as to effect opposite displacement of the right and left-hand control levers 22 to rotate the cranks 30 oppositely and thereby tilt the blade equally and oppositely to tilting of the frame 12. As a result, the blade edge 21a is maintained in the desired plane 84.

In the modified form of the invention illustrated in Fig. 9 where similar elements are given numbers identical to those applied to the previously described embodiment, the pivot assembly 36 is suspended from the frame and from the cross bar 35 generally forward of the blade assembly 19. The platform 37 mounting the gyroscope 42 is pivoted to the cross bar at 38 and extends forwardly therefrom to its pivotal connection 41 with the vertical link 39, which is suspended from the forward portion of the frame 17. The length of the platform 37 is preferably made approximately equal to one-third the distance between draw bar pivot 26 and the blade 21 in order to substantially magnify the angular relationship established as between the pivot angles of the platform 37 and the draw bar 25 during longitudinal vertical pivoting of these elements, to the end that blade assembly 19 may be more accurately maintained in vertical position during a grading operation.

I claim:

1. The combination, comprising a motor grader including a longitudinally extending frame variably inclinable laterally and longitudinally during grader movement along an uneven ground surface, a grading blade assembly including a blade having a working edge transported by said grader in working relation to the ground, support means carried by said frame mounting said assembly beneath said frame for displacement relative thereto, power actuated means connected with said assembly to effect displacement of said blade into earth grading position, a manual control for said power means, and means including a potentiometer continuously controlling said manual control and operating to effect displacement of said blade assembly in response to frame inclination for maintaining said blade edge in a plane extending in the direction of movement of said grader during transportation of said assembly, said last named means also including a gyroscope inclinable with said assembly and controlling said potentiometer, a motor and a clutch connected between said motor and said manual control, engagement of said clutch being controlled by said potentiometer.

2. The invention as defined in claim 1 in which said potentiometer has an electrical output controlled by angular displacement of said gyroscope relative to said frame, and said clutch is electrically connected with said potentiometer to receive said output and is electrically energizable in response to changes in said potentiometer output.

3. The invention as defined in claim 1 including a pivot assembly connected to said blade assembly and mounting said gyroscope for inclination relative thereto to establish the plane in which said blade edge is maintainable.

4. The invention as defined in claim 3 in which said pivot assembly is connected with the frame and includes a gyroscope support pivotally connected with said blade assembly.

5. The invention as defined in claim 4 in which said support means includes a draw bar connected with the frame to pivot in a longitudinally extending plane, and including a hinge connecting said gyroscope support to said blade assembly for pivoting in said plane opposite to pivoting of the draw bar in said plane relative to said frame.

6. The invention as defined in claim 4 in which said gyroscope support is connected to said blade assembly for lateral pivoting therewith relative to said frame.

7. The invention as defined in claim 3 in which said pivot assembly includes a gyroscope support having pivotal connection with said blade assembly and said frame, and including an adjustable connection between said gyroscope support and said gyroscope.

8. The combination, comprising a motor grader including a longitudinally extending frame variably inclinable laterally and longitudinally during grader movement along an uneven ground surface, a grading blade assembly including a blade having a working edge transported by said grader in working relation to the ground, a draw bar carried by said frame carrying said assembly beneath said frame for displacement relative thereto, power actuated means connected with said assembly to effect displacement of said blade into earth grading position, a manual control for said power means, means controlling said manual control and operating to effect displacement of said blade assembly relative to the frame in response to frame inclination for maintaining said blade edge in a plane extending in the direction of movement of said grader during transportation of said assembly, said last named means including means keeping a reference direction during variable frame inclination, means for actuating said manual control and electrical means continuously controlling said actuating means in response to changes in relative inclination between said direction keeping means and frame, and means connecting said direction keeping means with the frame above said draw bar and with said blade assembly.

9. The invention as defined in claim 8 in which said manual control comprises a pair of handles movable by said actuating means to effect displacement of said blade assembly relative to the frame.

10. The combination comprising a motor grader including a longitudinally extending main frame assembly variably inclinable laterally and longitudinally during grader forward movement along an uneven ground surface, a movable frame assembly underlying the main frame assembly and comprising a grading blade assembly including a blade having a working edge adapted to be transported in working relation to the ground and a drawbar pivotally connected to the forward portion of the main frame assembly for angular displacement relative thereto in respective longitudinal and transverse movement planes, said blade assembly being carried by the drawbar, power actuated means connected with said movable frame assembly to effect displacement of the blade into earth grading position, and automatic control means for controlling said power means operative to effect automatic displacement of said movable frame assembly relative to the main frame assembly in response to inclination of the latter for maintaining said blade edge in predetermined relation to a plane extending in the direction of grader forward movement during transportation of said movable frame assembly, said automatic control means comprising means keeping a reference direction during variable frame inclination, electrical circuit means including two relatively rotatable members and acting to produce an electrical signal responsive to mutual rotation of said members, means mounting the members on one of said frame assemblies for relative rotation about an axis that is substantially perpendicular to one of said movement planes, means connecting said direction keeping means with one of said members and acting to maintain said one member in predetermined angular relation to the reference direction, linkage means connecting the other member with the other frame assembly independently of said power actuated means and acting to cause mutual rotation of said members in response to relative movement of said frame assemblies, means for actuating said power actuated means, and electrical means continuously controlling said actuating means in response to the electrical signal produced by said electrical means.

11. The combination defined in claim 10, and wherein said axis is substantially perpendicular to said longitudinal movement plane, and said linkage means causes rotation of said other member about the axis in a direction opposite to the angular movement of said movable frame assembly relative to said main frame assembly in said longitudinal movement plane.

12. The combination defined in claim 10, and wherein said actuating means includes a manual control for the power means, and said electrical controlling means is operatively connected to the manual control.

13. A blade control system for a grading machine which comprises a vehicle frame, a drawbar pivotally supported adjacent its forward end on the vehicle frame for angular movements in respective longitudinal and transverse movement planes, an earthworking blade mounted adjacent the rearward end of the drawbar, two power lift mechanisms connected with the drawbar at respective laterally spaced connection points thereof, each of said lift mechanisms being actuable in two opposite directions to raise and lower, respectively, the point of the drawbar to which it is connected; said control means comprising first sensing means responsive to drawbar movement in said longitudinal movement plane, second sensing means responsive to drawbar movement in said transverse movement plane, first actuating means for actuating both lift mechanisms in a common direction under control of the first sensing means, and second actuating means for causing differential actuation of the lift mechanisms under control of the second sensing means.

14. A blade control system as defined in claim 13, and wherein said second actuating means causes actuation of both lift mechanisms in opposite directions under control of the second sensing means.

References Cited in the file of this patent

UNITED STATES PATENTS

| | | |
|---|---|---|
| 1,038,460 | Tanner | Sept. 10, 1912 |
| 1,144,935 | Leeuw | June 29, 1915 |
| 1,936,518 | McColm | Nov. 21, 1933 |
| 2,034,141 | Gustafson | Mar. 17, 1936 |
| 2,173,656 | Newell | Sept. 19, 1939 |
| 2,420,932 | Cornelius | May 20, 1947 |
| 2,472,944 | Furer et al. | June 14, 1949 |
| 2,494,069 | Steffen | Jan. 10, 1950 |
| 2,555,034 | Hay | May 29, 1951 |
| 2,635,469 | Summers | Apr. 21, 1953 |
| 2,636,290 | Bell | Apr. 28, 1953 |
| 2,722,125 | Siebengartner et al. | Nov. 1, 1955 |